United States Patent
Matsunaga et al.

(10) Patent No.: US 11,838,859 B2
(45) Date of Patent: Dec. 5, 2023

(54) INFORMATION PROCESSING APPARATUS, INFORMATION PROCESSING METHOD, AND PROGRAM

(71) Applicant: Honda Motor Co., Ltd., Tokyo (JP)

(72) Inventors: Hideki Matsunaga, Wako (JP); Masaru Otaka, Wako (JP); Masamitsu Tsuchiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 479 days.

(21) Appl. No.: 17/173,295

(22) Filed: Feb. 11, 2021

(65) Prior Publication Data

US 2021/0168709 A1 Jun. 3, 2021

Related U.S. Application Data

(63) Continuation of application No. PCT/JP2019/014304, filed on Mar. 29, 2019.

(51) Int. Cl.
 *H04W 48/20* (2009.01)
 *H04W 4/44* (2018.01)
 *H04W 24/08* (2009.01)

(52) U.S. Cl.
 CPC ............. *H04W 48/20* (2013.01); *H04W 4/44* (2018.02); *H04W 24/08* (2013.01)

(58) Field of Classification Search
 CPC ........ H04W 48/20; H04W 24/08; H04W 4/44
 See application file for complete search history.

(56) References Cited

U.S. PATENT DOCUMENTS

| | | | |
|---|---|---|---|
| 2009/0262686 A1 | 10/2009 | Ebata et al. | |
| 2010/0124927 A1* | 5/2010 | Eskicioglu | H04W 36/32 455/436 |
| 2010/0130242 A1* | 5/2010 | Hayashi | H04W 12/062 340/901 |
| 2012/0230247 A1 | 9/2012 | Kwon et al. | |
| 2015/0031284 A1* | 1/2015 | Pitakdumrongkija | H04W 24/02 455/9 |
| 2015/0072696 A1* | 3/2015 | Nakata | H04W 16/18 455/450 |
| 2016/0037541 A1* | 2/2016 | Kim | H04B 7/024 370/329 |

(Continued)

FOREIGN PATENT DOCUMENTS

| | | |
|---|---|---|
| CN | 102771063 A | 11/2012 |
| CN | 109510912 A | 3/2019 |

(Continued)

OTHER PUBLICATIONS

Notification of first review comments from Chinese Intellectual Property Office for Chinese Patent Application No. 2019800945083, dated May 31, 2023.

(Continued)

*Primary Examiner* — Zhiren Qin
(74) *Attorney, Agent, or Firm* — Suzanne Gagnon; American Honda Motor Co., Inc.

(57) ABSTRACT

An information processing apparatus may acquire first information on communication status of a fixed terminal device and second information on communication status of a mobile terminal device, and may determine which of the first information and the second information is preferentially used to execute predetermined control processing.

18 Claims, 6 Drawing Sheets

(56) References Cited

U.S. PATENT DOCUMENTS

| | | | | |
|---|---|---|---|---|
| 2017/0034667 A1* | 2/2017 | Kumabe | .......... | G08G 1/096758 |
| 2018/0302768 A1* | 10/2018 | Uchiyama | ......... | H04W 52/0216 |
| 2018/0365994 A1* | 12/2018 | Song | .................. | G01C 21/3815 |
| 2021/0211845 A1* | 7/2021 | Lin | ......................... | H04W 4/40 |
| 2022/0036729 A1* | 2/2022 | Moustafa | ........... | G01C 21/3848 |
| 2022/0044566 A1* | 2/2022 | Subramanya | .......... | G08G 1/144 |

FOREIGN PATENT DOCUMENTS

| | | | |
|---|---|---|---|
| EP | 2136600 A2 | 12/2009 |
| JP | H11298969 A | 10/1999 |
| JP | 2009267963 A | 11/2009 |
| JP | 2010004122 A | 1/2010 |
| JP | 2010146489 A | 1/2010 |
| JP | 2013506377 A | 2/2013 |
| JP | 2015-056678 A | 3/2015 |
| JP | 2017216663 A | 12/2017 |
| WO | 2015029683 A1 | 3/2015 |
| WO | WO2017183206 A1 | 10/2017 |
| WO | 2018003304 A1 | 4/2018 |
| WO | 2018233699 A1 | 12/2018 |

OTHER PUBLICATIONS

International Search Report of related international application PCT/JP2019/014304, dated Jun. 18, 2019.
English Translation of International Search Report of related international application PCT/JP2019/014304, dated Jun. 18, 2019.
Written Opinion of the International Searching Authority of related international application PCT/JP2019/014304, dated Jun. 18, 2019.
Notice of Reasons for Refusal from Japan Patent Office for Japanese Patent Application No. 2021-511749, dated Dec. 2, 2022.
Lim, et al., Accurate and Cost-Effective Traffic Information Acquisition using Adaptive Sampling: Centralized and V2V Schemes, Transportation Research Part C:Emerging Technologies, Mar. 6, 2017, vol. 94, pp. 99-120, Pergamon, New York, NY.
Supplementary European Search Report of related European application EP20190923025 , dated Mar. 14, 2022.
Final Notice of Reasons for Refusal from Japan Patent Office for Japanese Patent Application No. 2021-511749, dated May 15, 2023.
Communication from the Examining Division for related European application EP19923025.1 , dated Mar. 20, 2023.
Communication from the Examining Division or Related European Application EP19923025, dated Nov. 8, 2022.

* cited by examiner

| Number of samples (S) for second information | Priority use information |
|---|---|
| $S1 < S$ | Second information |
| $S2 < S \leq S1$ | First information and second information |
| $S \leq S2$ | First information |

FIG. 5

INFORMATION PROCESSING APPARATUS, INFORMATION PROCESSING METHOD, AND PROGRAM

CROSS-REFERENCE TO RELATED APPLICATION

This application is a continuation of International Patent Application No. PCT/JP2019/014304 filed Mar. 29, 2019, the entire disclosure of which is incorporated herein by reference.

BACKGROUND

An operator at remote location may operate and move a vehicle through remote driving techniques. One element for the remote driving may be to sufficiently suppress a communication delay between an operator device operated by an operator who executes remote driving and a terminal device mounted in the vehicle.

SUMMARY

A cellular wireless communication network with an expanded communication area may be used for communication when performing vehicle driving control such as remote driving. When vehicle driving control is performed via such a cellular wireless communication network, information on communication status with a connected base station may be understood, and control processing may be executed based on the communication status information. Therefore, it is important to use highly accurate communication status information in order to execute appropriate control processing.

According to an aspect of the present disclosure, an information processing apparatus is provided. The information processing apparatus includes a memory for storing computer readable code and a processor operatively coupled to the memory. The processor may be configured to acquire first information on communication status of a fixed terminal device and second information on communication status of a mobile terminal device, and determine which of the first information and the second information for executing predetermined control processing is preferentially used.

According to another aspect of the present disclosure, a computer-implemented method executed by an information processing apparatus is provided. The method includes acquiring first information on communication status of a fixed terminal device and second information on communication status of a mobile terminal device, and determining which of the first information and the second information is preferentially used to execute predetermined control processing.

According to another aspect of the present disclosure, a non-transitory computer readable storage medium storing instructions that when executed by a computer, which includes a processor, perform a method, is provided. The method includes acquiring first information on communication status of a fixed terminal device and second information on communication status of a mobile terminal device, and determining which of the first information and the second information is preferentially used to execute predetermined control processing.

Accordingly, it becomes possible to execute the predetermined control processing using a highly accurate communication status. Other features and advantages of the present disclosure will be apparent from the following description with reference to the accompanying drawings. Note that in the accompanying drawings, the same or similar components are denoted by the same reference numerals.

BRIEF DESCRIPTION OF DRAWINGS

The accompanying drawings are included in the specification, constitute a part of the specification, illustrate embodiments of the present disclosure, and are used together with the description to explain aspects of the present disclosure.

FIG. 5 is a diagram illustrating a corresponding relationship between the number of samples for second information and information used preferentially according to an exemplary embodiment.

DESCRIPTION OF EMBODIMENTS

Figure 1:
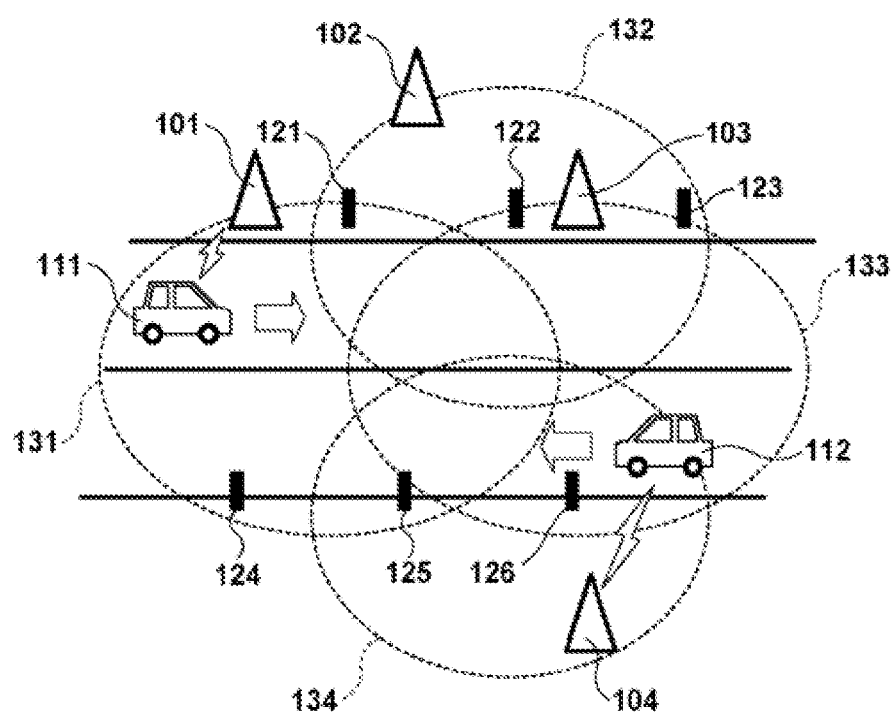
FIG. 1 is a diagram illustrating a configuration example of a communication system according to an exemplary embodiment.

Embodiments are described in detail with reference to the accompanying drawings. Note that the following embodiments do not limit the disclosure according to the claims, and not all combinations of the features described in the embodiments are essential for the disclosure. Two or more of the plurality of features described in the embodiments may be arbitrarily combined. Further, the same or similar components are denoted by the same reference numerals, and duplicated description thereof will be omitted.

FIG. 1 illustrates a configuration example of a communication system according to an exemplary embodiment. The communication system is, for example, a cellular wireless communication system, and is configured to include base stations 101, 102, 103, and 104, moving terminal devices 111 and 112 (mobile terminals), and fixed terminal devices 121, 122, 123, 124, 125, and 126 (fixed terminals). The base stations 101, 102, 103, 104 form cells 131, 132, 133, and 134 respectively, and a base station performs wireless communication by being connected to a terminal device located in a cell formed by the base station. Note that the terminal device may be connected to any of the base stations that form a cell that covers a position of the terminal device and performs wireless communication. That is, a cell may be arranged so as to overlap with another cell in at least a part of the cell, and the terminal device may be connected to the base station forming any cell in an area where the cell overlaps. In one example, the base stations 101 to 104 are base stations (gNodeB) of the fifth generation (5G) cellular communication system, and the mobile terminals 111 and 112 and the fixed terminals 121 to 126 are terminals (user equipment (UE)) of the 5G cellular communication system.

However, the present disclosure is not limited thereto, and these communication devices may comply with long term evolution (LTE) or cellular communication standards of other generations. In addition, the base stations 101 to 104 may be base stations directly connected to a core network (for example, evolved packet core (EPC)), or may be relay stations wirelessly connected to other base stations.

In an exemplary embodiment, the mobile terminals 111 and 112, which are mounted in a vehicle, perform wireless communication to perform traveling control of the vehicle, such as remote driving or the like. However, this is only an example, and the control for executing a predetermined operation by any terminal device having a mobile function and a wireless function, which may be connected to a cellular communication network such as a smartphone, a mobile phone, and a personal computer, may be performed based on a procedure as described later. Further, in general, one base station may form a plurality of cells, however, in the exemplary embodiment, an example in which one base station forms one cell is illustrated. In the following description, when the base station transmits information to the terminal device, the information transmission may be performed for each cell. That is, when the base station forms a plurality of cells, the information transmission may be performed multiple times for each cell.

The example of FIG. 1 illustrates a case in which the mobile terminal 111 is present within a range of the cell 131 that is formed by the base station 101, and is connected to the base station 101 to perform the wireless communication. In addition, FIG. 1 illustrates a case in which the mobile terminal 112 is present within a range of the cell 134 that is formed by the base station 104, and is connected to the base station 104 to perform the wireless communication. Although the position of the mobile terminal 112 is also within the range of the cell 133 formed by the base station 103, for example, because a radio quality of a signal from the base station 104 is higher than that of a signal from the base station 103, the mobile terminal 112 may be connected to the base station 104.

Further, FIG. 1 illustrates an example in which the fixed terminals 121 to 126 are arranged on a road shoulder along a road. Like the mobile terminals 111 and 112, these fixed terminals 121 to 126 are connected to the base station forming the cell in which it is present. The fixed terminals 121 to 126 are used for collecting communication status, and for example, periodically communicate with the base station. By this communication, for example, samples of the communication status at the base station and the like are collected. The fixed terminals 121 to 126 may be arranged in a median strip instead of the road shoulder, and may be embedded in a road surface, for example. Further, the fixed terminals 121 to 126 may be arranged at positions apart from the road.

In an exemplary embodiment, the base station, the terminal device, or an external device connected to a network may execute predetermined control processing with a communication partner device of the terminal device, such as an operator device (not illustrated) operated by an operator of a remote operation, using information on communication quality or status such as the radio quality or a communication delay. Note that the communication status is a measured value in a real environment such as the communication delay or radio quality (e.g., signal to interference and noise power ratio (SINR), signal to noise ratio (SIR), reference signal received power (RSRP), reference signal received quality (RSRQ), received signal strength indicator (RSSI), and the like) actually measured during actual communication. The predetermined control processing may be control for automatic driving or remote driving in one example. For example, when the radio quality of the communication by the terminal device is relatively low or when the communication delay is large, limited control such as stop control or acceleration/deceleration control may be executed. Meanwhile, when the radio quality of the communication by the terminal device is relatively high or the communication delay is small, control having a high degree of freedom, such as lane change control, may be executed. Further, the predetermined control processing may be selection control of the base station to which the terminal device is connected. For example, the terminal device needs to be connected to the base station corresponding to a route where the communication delay may be sufficiently reduced.

In order to appropriately execute the predetermined control processing as described above, highly accurate information on the communication status is required. For example, if the predetermined control processing is executed using information on the communication status having a large error, the error may cause a device to be controlled to exhibit behaviors that should not be performed. Therefore, the exemplary embodiment provides a method for increasing accuracy of information on communication status used when executing the control processing.

The information processing apparatus according to the exemplary embodiment acquires first information on the communication status of the communication by the fixed terminal and second information on the communication status of the communication by the mobile terminal, and determines which of the first information and the second information is used when the predetermined control processing is executed. Since fixed terminals may always perform communication at the same position, the communication status at a certain position may be sampled multiple times. Meanwhile, in order to acquire a sample indicating the communication status of the communication by the mobile terminal at a certain position, the mobile terminal needs to move to that position. Therefore, it is generally assumed that the number of times of acquisition of the samples for the mobile terminal tends to be smaller than the number of times of acquisition of the samples for the fixed terminal. Note that there may be a larger number of times of acquisition of the samples for the mobile terminal depending on a timing when the fixed terminal is arranged. In the exemplary embodiment, the collected sample values themselves may be used, or the first information and the second information are specified by deriving, for example, a mean or a variance based on the sample values.

In some aspects, the information processing apparatus may determine which of the first information and the second information is preferentially used, for example, depending on the acquired number of samples for the second information. That is, the first information is assumed to obtain a sufficiently large number of samples by making the fixed terminal that is fixed in one location continuously communicate with the base station to perform the measurement, and the first information is useful for recognizing the general tendency of the communication status in order to specify the communication status of the mobile terminal, however, the influence of Doppler shift due to movement cannot be considered. Meanwhile, the second information is useful for specifying the communication status of the mobile terminal, however, there may be a case in which the second information cannot obtain a sufficient number of samples. For this reason, the information processing apparatus may determine to preferentially use the second information, for example, when the number of samples for the second information exceeds a first predetermined number. In addition, the information processing apparatus may determine to preferentially use the first information, for example, when the number of samples for the second information does not exceed a second predetermined number. For example, a first predetermined value is greater than a second predetermined value.

The information processing apparatus may determine which of the first information and the second information is preferentially used based on not only the number of samples but also other factors. For example, the information processing apparatus may determine to preferentially use the first information when a target device controlled by the predetermined control processing is the fixed terminal or a low speed mobile terminal. Further, the information processing apparatus may determine which of the first information and the second information is preferentially used according to the speed at which the target device controlled by the predetermined control processing moves. The information processing apparatus may generate the information on the communication status used in the predetermined control processing, for example, by performing a weighted addition of a value indicated by the first information and a value indicated by the second information according to a priority value indicating which information is to be preferentially used. For example, when a weight by which a value v1 indicated by the first information is multiplied is w1 and a weight by which a value v2 indicated by the second information is multiplied is w2, the information processing apparatus may specify $v1 \times w1 + v2 \times w2$ as the value indicating the communication status used in the predetermined control processing. At this time, $w1 + w2 = 1$, $w1 \geq 0$, $w2 \geq 0$, and w1 may be increased as the priority of the first information is higher, and w2 may be increased as the priority of the second information is higher. Here, w1 or w2 may take continuous values or stepwise values. As an example, when the target device of the control processing is the mobile terminal, w2 may be increased as the moving speed becomes higher, and w1 may be increased as the moving speed becomes lower. In addition, the information processing apparatus may use other arbitrary criteria or methods to determine which of the first information and the second information is preferentially used, or to determine the weight value, and the like.

Note that the first information and the second information may be acquired for each of one or more base stations. That is, for each base station, the information on the communication status of the communication performed by the terminal devices at the base stations is collected, the first information and the second information are generated, and the information processing apparatus may acquire the first information and the second information. As a result, for each of one or more base stations, it is possible to separately acquire the information on the communication status at the time of connecting and communicating with the base stations.

Further, the information processing apparatus may be included in one base station of the one or more base stations. In this case, the information processing apparatus may acquire the first information and the second information based on the communication by the terminal device connected to the one base station. For example, the information processing apparatus communicates with the terminal device located in the cell formed by the base station via this one base station, and at that time, the determination on whether the terminal device is the fixed terminal or the mobile terminal and the measurement of the communication status (for example, radio quality or communication delay) may be performed. Then, the information processing apparatus may acquire the value of the measurement result itself or the value derived from the measurement result as the first information and the second information. As a result, when it is assumed that the terminal device is connected for communication to the base station including the information processing apparatus, the information processing apparatus may estimate the communication status in the communication in advance. Note that the information processing apparatus may acquire the first information and the second information on the base station from other base stations. As a result, the information processing apparatus acquires, for example, the information on neighboring base stations that are adjacent to the base station that includes the information processing apparatus, so the control processing that also considers the communication status of the neighboring base stations may be executed. For example, the information processing apparatus may execute the control processing for handing over the terminal device connected to the base station including the information processing apparatus to the neighboring base stations that are estimated to have a good communication status such as a short communication delay.

Note that the information processing apparatus may be a network node or an external device such as an operator device operated by an operator of a remote operation, for example. The information processing apparatus may collect from one or more base stations the information on the communication status obtained as a result of making the one or more base stations existing in a certain range communicate with a subordinate terminal device. It should be noted that each base station may generate the first information and the second information and transmit the generated first information and second information to the information processing apparatus. In other aspects, each base station may provide the information processing apparatus with a value indicating the communication status acquired by each base station, and the information processing apparatus may generate the first information and the second information based on the value. Then, the information processing apparatus may determine which of the first information and the second information is preferentially used, for example, as described above.

Further, the information processing apparatus may provide at least one of the acquired first information and second information to other devices in response to a request from the other devices. In some aspects, the information processing apparatus may provide, for example, only the information determined to be used for the predetermined control processing to other devices. In other aspects, the information processing apparatus may provide other devices with the information derived from the first information and the second information as the information to be used for the predetermined control processing. In this case, the other devices may execute the predetermined control processing based on the provided information. For example, the other devices are the base station or the terminal device, and may execute handover processing or the like as the predetermined control processing based on the provided information.

The fixed terminal may be arranged at a predetermined position, for example, along a predetermined road and the like through which a small quantity of mobile terminals such as a vehicle passes. As a result, by arranging the fixed terminal in a location where it is not easy to acquire the second information on the mobile terminal, it becomes possible to obtain the first information with high accuracy as an alternative, and by using the obtained first information, it is possible to execute the predetermined control processing at a certain level. In some aspects, the mobile terminal may be, for example, an in-vehicle terminal mounted on a vehicle that is the control target of the remote driving or the automatic driving. As a result, for example, by passing the mobile terminal through a predetermined road while performing the remote driving or the automatic driving, it is possible to obtain a sample value indicating the communication status of the predetermined road, and further improve the accuracy of the second information.

An example of a configuration of the information processing apparatus that performs the above-described processing will be described with reference to FIG. 2 and FIG. 3.

Figure 2:
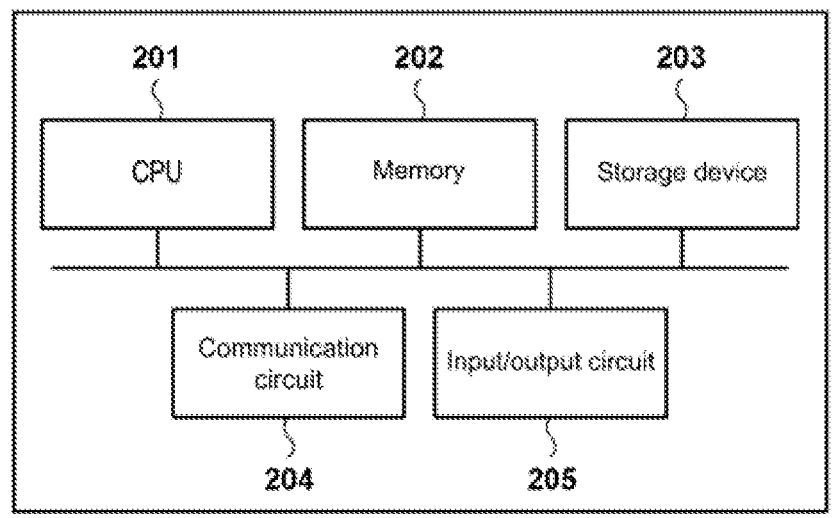
FIG. 2 is a diagram illustrating a hardware configuration example of an information processing apparatus according to an exemplary embodiment.

FIG. 2 illustrates a hardware configuration example of the information processing apparatus according to an exemplary embodiment. The information processing apparatus is a general-purpose computer in one example, and includes, for example, a CPU 201, a memory 202, a storage device 203, a communication circuit 204, and an input/output circuit 205. The CPU 201 executes, for example, a program stored in the memory 202 to execute processing described later and control of the apparatus. Note that the CPU 201 may be replaced by any one or more processors such as an MPU and an ASIC. The memory 202 holds programs for causing the information processing apparatus to execute various processes, and also functions as a working memory when the programs are executed. The memory 202 is, for example, a random access memory (RAM) or a read only memory (ROM). The storage device 203 is, for example, a removable external storage device, a built-in hard disk drive, or the like, and holds various information.

The communication circuit 204 executes signal processing regarding communication, acquires various information from an external device through a communication network, and transmits various information to the external device. Note that the information acquired by the communication circuit 204 may be stored in the memory 202 or the storage device 203, for example. Note that the information processing apparatus may include a plurality of communication circuits 204. For example, the information processing apparatus may include a first communication circuit that may be used to communicate with other devices for collecting information, and a second communication circuit for providing information to other devices or for performing communication for performing control processing of other devices. When the information processing apparatus is included in the base station, the information processing apparatus may include a wired communication circuit for communication with a network node in a core network or other base stations and a wireless communication circuit (for example, operated according to cellular communication standards such as 5G or LTE) for communication with the terminal device. In this case, in one example, the information processing apparatus may establish an X2 interface with other base stations to perform direct communication, or may use an S1 interface to communicate with other base stations via the core network. Further, the information processing apparatus may establish a radio link with other devices to perform communication for connection with other base stations or the core network. The information processing apparatus may include a communication circuit for communicating with each of the supported communication standards. The input/output circuit 205 controls, for example, output of screen information displayed on a display device (not illustrated), voice information output from a speaker, or reception of user input via a keyboard, a pointing device, or the like. Note that the input/output circuit 205 may control a device such as a touch panel that integrally performs input/output. Note that the configuration of FIG. 2 is an example, and the information processing apparatus may be configured by dedicated hardware that executes the above-described processing, for example.

Figure 3:
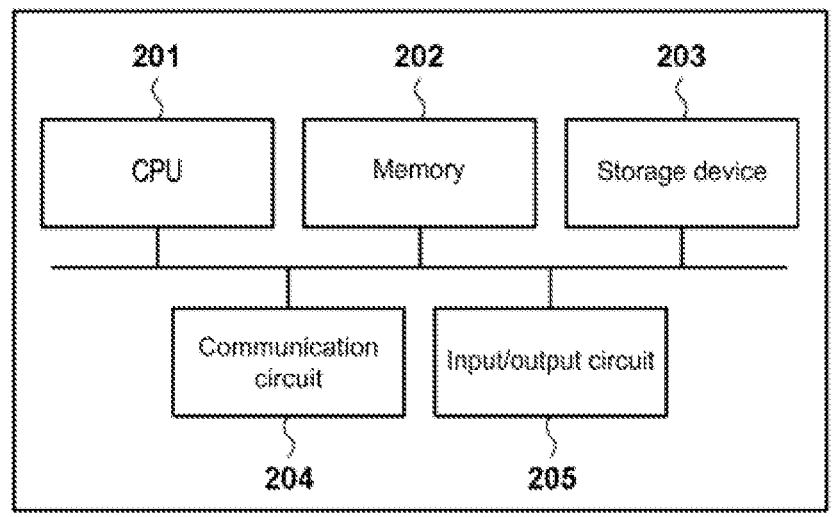
FIG. 3 is a diagram illustrating a functional configuration example of an information processing apparatus according to an exemplary embodiment.

FIG. 3 illustrates a functional configuration example of the information processing apparatus. In one example, the information processing apparatus includes a communication control unit 301, an information collection unit 302, an information management unit 303, a priority determination unit 304, and a control processing unit 305.

The communication control unit 301 performs communication execution control for collecting information and notifying information. The information collection unit 302 collects a sample value indicating communication status such as communication delay of a communication link with other devices via the communication control unit 301, or acquires the first information and the second information obtained from the sample value. For example, the communication control unit 301 executes control for establishing a communication link with other devices and performing communication in order to collect information. For example, when the information processing apparatus is included in the base station and the information on communication with the terminal device connected to the base station is collected, the communication control unit 301 establishes the radio link with the terminal device, and the information collection unit 302 may obtain a sample indicating the communication status regarding communication on the radio link. At this time, the information collection unit 302 may acquire information that specifies whether the terminal device is the fixed terminal or the mobile terminal. The information collection unit 302 may acquire information that classifies not only whether the terminal device is the fixed terminal or the mobile terminal, but also classifies the terminal device in various types such as a type of an in-vehicle terminal or a smartphone or a terminal category. As a result, the information collection unit 302 may execute the information collection for a large number of terminal devices to collect samples indicating the actually measured communication status obtained in the communication between many types of terminal devices. The information collection unit 302 may execute the information collection for the terminal device multiple times to converge the value indicated by the information indicating the communication status corresponding to each type of the first information, the second information, and the like. In addition, when the information processing apparatus is included in the base station, the communication control unit 301 establishes a communication link between other base stations, and may acquire sample values indicating the communication status acquired in other base stations or the first information and the second information obtained from the sample values thereof. In addition, for example, when the information processing apparatus is an external device such as the operator device of the remote operation or the network node on the core network, the communication control unit 301 may acquire the sample value indicating the communication status of the communication by the terminal device via one or more base station in a predetermined range or the first information and the second information obtained from the sample value. Note that the communication status may be communication status regarding the communication between the terminal device and the base station, or communication status regarding communication between the terminal device and a partner device of the terminal device such as the operator device. That is, within the communication related range by the terminal device, the contents of which communication section the partner device or the communication status is related to may be set arbitrarily. In this way, the information collection unit 302 may collect the first information indicating the communication status of the fixed terminal and the second information indicating the communication status of the mobile terminal, for one or more base stations. Note that the information on the position of the terminal device may be acquired during the collection. As a result, it becomes possible to associate the geographical position with the first information and the second information.

The information management unit 303 manages the information collected by the information collection unit 302. The information management unit 303 separately manages, for example, the sample value indicating the communication status regarding the communication by the fixed terminal and the sample value indicating the communication status regarding the communication by the mobile terminal. In addition, the information management unit 303 separately manages, for example, the first information obtained from the sample value indicating the communication status regarding the communication by the fixed terminal and the second information obtained from the sample value indicating the communication status regarding the communication by the mobile terminal. Note that the sample value indicating the communication status regarding the communication by other types of terminal devices or the information obtained from the sample value may be managed in association with the information indicating the type. In addition, when the information management unit 303 manages the first information and the second information, the information management unit 303 may also manage the information on the number of samples for acquiring the first information and the second information. Further, the information management unit 303 may manage the first information and the second information together with the sample values for obtaining the information.

The priority determination unit 304 determines which of the first information and the second information is preferentially used based on, for example, the number of samples for obtaining the first information and the second information. When there are three or more pieces of information indicating the communication status of three or more types of terminal devices, the priority determination unit 304 may determine the priority of these pieces of information. In addition, the priority determination unit 304 may determine a weighting coefficient as described above for generating the information indicating the communication status used for the predetermined control processing according to each priority. Note that, for example, the priority determination unit 304 may determine the priority according to the type of the terminal device to be controlled. For example, when the mobile terminal is the control target, it may be determined that the second information on the communication by the mobile terminal is preferentially used, and when the fixed terminal is the control target, the first information on the communication by the fixed terminal is preferentially used. Note that, for example, the priority determination unit 304 may determine the priority according to the type of the terminal device notifying the communication status. For example, it may be determined that the first information from the fixed terminal (e.g., a road terminal device) arranged in association with a predetermined road (for example, arranged along the predetermined road) is preferentially used. That is, in addition to or apart from the priority according to the classification of the fixed terminal device or the mobile terminal device, additional priority may be given. In one example, the first information on the road terminal device may be preferentially used even in the situation where the second information on the mobile terminal device should be prioritized over the first information on the fixed terminal device. Also, in another example, the first information on the road terminal device may not be prioritized over the second information on the mobile terminal device, but may be preferentially used to the first information on other fixed terminal devices. In some aspects, the predetermined road may be a road with which the execution of a predetermined operation mode is associated with a moving body moving on the road. For example, the predetermined road may be a road on which a vehicle traveling on the road is scheduled to perform the automatic driving or the remote driving. The road scheduled to execute the automatic driving or the remote driving may be, for example, a road having a dedicated lane for the automatic driving or the remote driving based on traffic regulations. On such roads where the automatic driving or the remote driving is expected to be performed, it is possible to perform the automatic driving or the remote driving with high accuracy by obtaining a number of samples of communication quality by the road terminal device. Further, the predetermined road may be, for example, a road in a state where the automatic driving or the remote driving is not permitted. In one example, by arranging a road terminal device on a road where the number of samples of communication quality is small and it is unknown whether the automatic driving or the remote driving may be performed, it is possible to increase the number of samples of communication quality to perform automatic driving or remote driving and increase the number of roads where the automatic driving or the remote driving may be executed.

The control processing unit 305 executes the predetermined control processing on the device to be controlled, based on the information managed by the information management unit 303 and the information on the priority determined by the priority determination unit 304. For example, when the information processing apparatus is included in the base station, the control processing unit 305 may execute the control processing for the handover of the terminal device connected to the base station to other base stations. Further, when the information processing apparatus is the network node, the control processing unit 305 may execute the predetermined control processing for causing the subordinate base station and the terminal device to execute the predetermined connection control or the handover control. Further, the control processing unit 305 may execute control other than the communication control, such as changing the control level of the remote driving, as the predetermined control processing.

When the communication control unit 301 receives a request from other devices, the information processing apparatus may provide the information managed by the information management unit 303 to the other devices. Further, for example, when the information processing apparatus is the network node, the information managed by the information management unit 303 may be periodically provided to the subordinate base station. That is, the information processing apparatus may provide the information in response to the request, or may provide the information without receiving the request.

Figure 4:
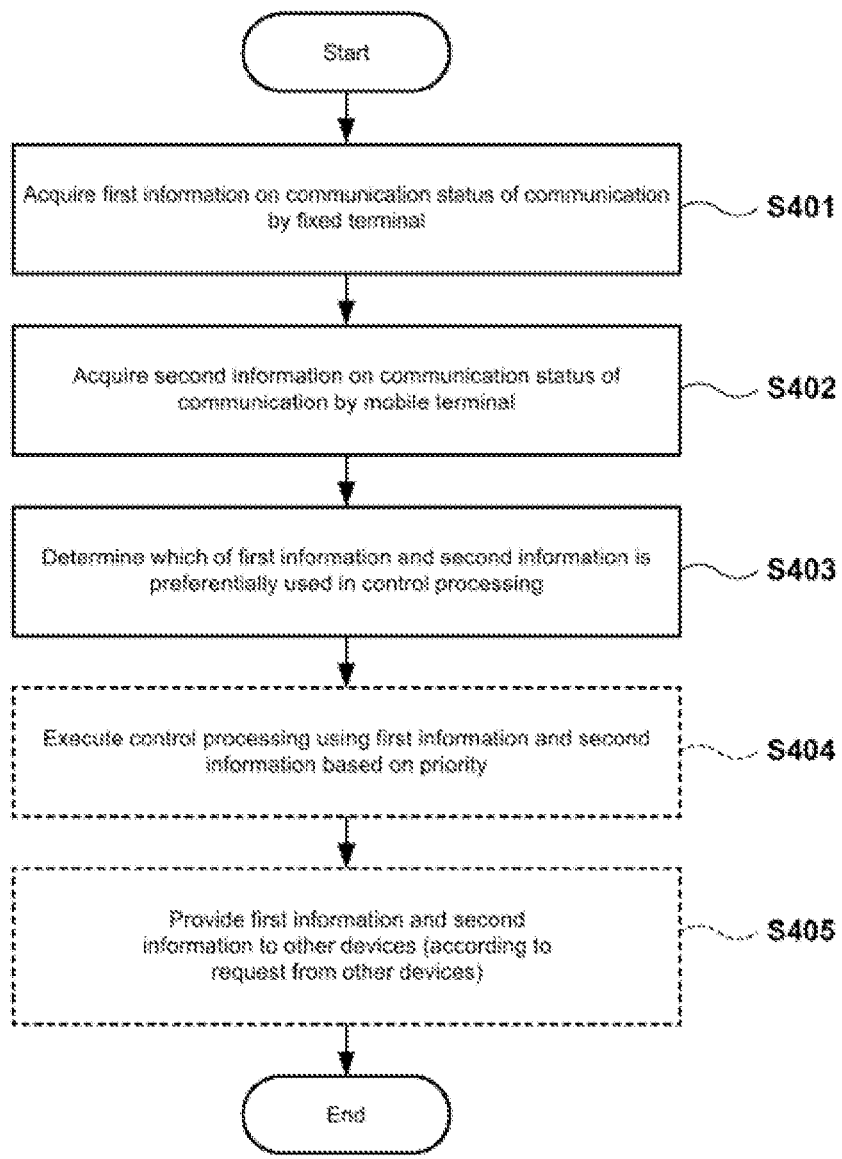
FIG. 4 is a flowchart illustrating an example of a method executed by an information processing apparatus according to an exemplary embodiment.

With reference to FIG. 4, an example of a method executed by the information processing apparatus will be described. The information processing apparatus acquires the first information on the communication status of the communication by the fixed terminal (S401) and the second information on the communication status of the communication by the mobile terminal (S402). For example, the information processing apparatus may collect the sample value for the communication status of the communication by the terminal device and derive the first information and the second information, or acquire the first information and the second information derived from the sample value by other devices. In some aspects, the information processing apparatus may acquire information on the communication status of communication by the type of terminal devices. When the information processing apparatus acquires the information on the communication status, it may also acquire the information on the type of terminal devices associated with the information. That is, when acquiring the first information or the corresponding sample value, the information indicating that the information relates to the fixed terminal may be provided together to the information processing apparatus. Similarly, when acquiring the second information or the corresponding sample value, the information indicating that the information relates to the mobile terminal may be provided together to the information processing apparatus. Note that when the first information or the second information are provided, the number of samples indicating the communication status used when the information is derived may also be provided together. In addition, instead of the number of samples, the information on the accuracy of the information may be provided. Generally, the accuracy of the information increases as the number of samples increases, however, even if the number of samples is small, it may be said that the accuracy is high if the information on the communication status is sufficiently converged. Therefore, when highly accurate information is obtained with a small number of samples, the time until the information may be used in control processing may be shortened.

Thereafter, the information processing apparatus determines which of the first information and the second information is preferentially used when executing the predetermined control processing (S403). This determination may be performed based on, for example, the number of samples used for deriving the information, the type of terminal devices to be controlled, or the like. For example, as illustrated in FIG. 5, (1) when the number of samples S on the second information exceeds a first predetermined number S1, the second information is preferentially used, (2) when the number of samples S for the second information does not exceed a second predetermined number S2, the first information is preferentially used, and (3) when the number of samples S for the second information is equal to or less than the first predetermined number S1 and exceeds the second predetermined number S2, the first information and the second information may have the same priority. The information processing apparatus may hold the result of the determination. Then, the information processing apparatus may execute the predetermined control processing using at least any one of the first information and the second information based on the result (priority) of the determination, if necessary. (S404). The information processing apparatus executes, for example, the predetermined control without using the second information when it is determined that the first information is preferentially used, and without using the first information when it is determined that the second information is preferentially used. In addition, the information processing apparatus may use the information obtained by multiplying a weight w (for example, 0.5<w<1.0) by the preferential information and multiplying and adding a weight 1−w by the non-preferential information, and may execute the predetermined control processing. Note that when other devices execute the predetermined control processing, the information processing apparatus may provide the determination result (priority), the first information, and the second information to other devices. Further, the information processing apparatus may provide the first information and the second information in response to, for example, receiving a request from other devices (S405). In this case, the priority information need not be provided. Further, when providing the priority information together with the first information and the second information to other devices, it is not necessary to collectively provide the information. For example, the first information and the second information are periodically provided, the priority information is requested when other devices need to perform the predetermined control processing, and the information processing apparatus may determine the priority in response to the request and provide the priority information. Note that the information processing apparatus executes S404, for example, when its own device executes the predetermined control processing, but does not have to execute the processing of S405. Similarly, the information processing apparatus may execute S405 when other devices execute the predetermined control processing, and may not execute S404.

Figure 6:
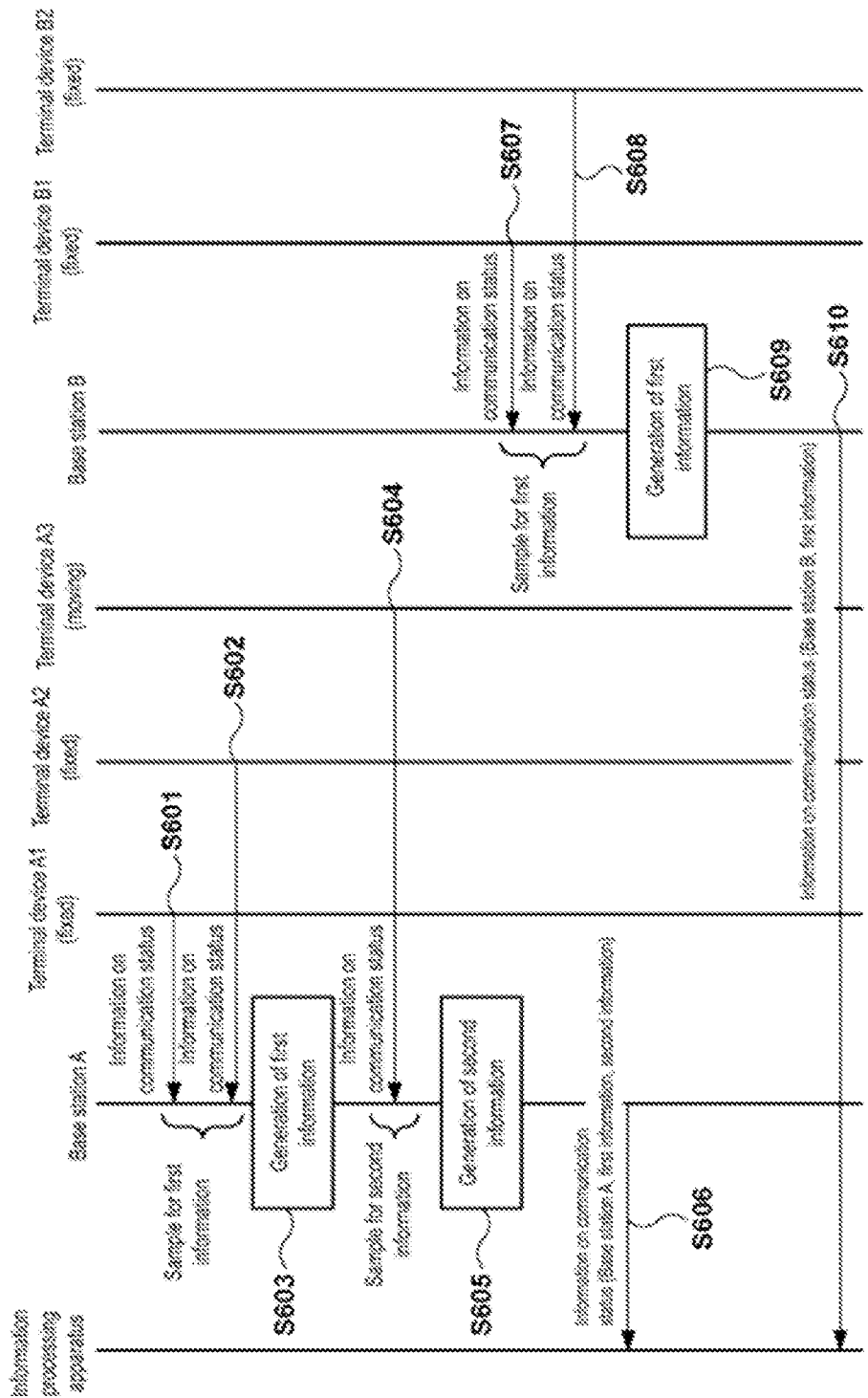
FIG. 6 is a diagram illustrating an example of a process flow executed in a communication system according to an exemplary embodiment.
Figure 7:
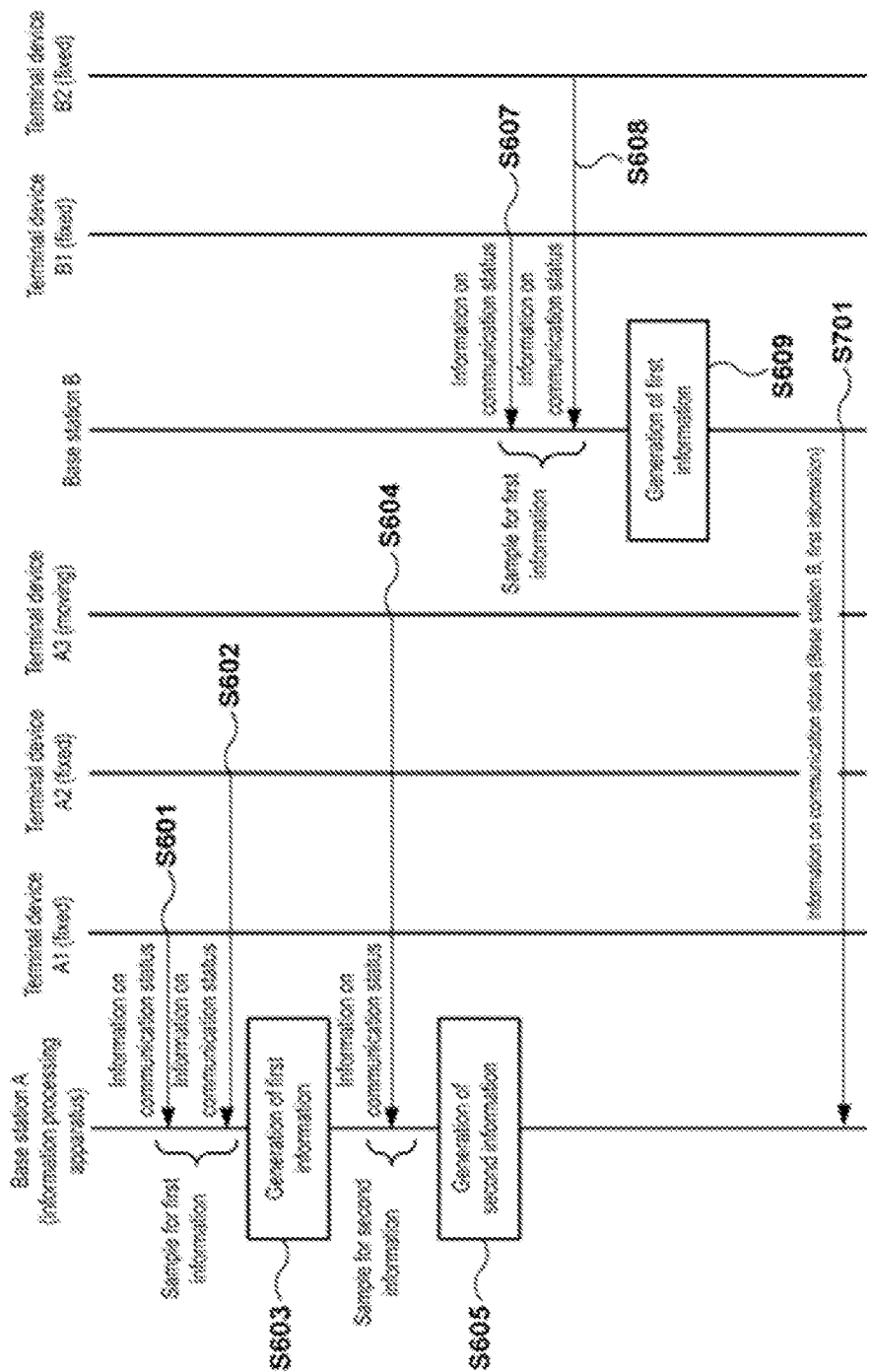
FIG. 7 is a diagram illustrating an example of a process flow executed in a communication system according to an exemplary embodiment.

A process flow in which the information processing apparatus acquires the first information and the second information in S401 and S402 will be described with reference to FIGS. 6 and 7. Note that FIGS. 6 and 7 illustrate an example in which the information processing apparatus obtains the information on the communication status of the terminal device connected to two base stations (base station A and base station B). Further, it is assumed that the base station A of the two base stations is connected to two fixed terminal devices (terminal device A1 and terminal device A2) and one mobile terminal device (terminal device A3). Further, it is assumed that two fixed terminal devices (terminal device B1 and terminal device B2) are connected to the base station B, and a moving terminal device is not connected. Further, in FIG. 7, it is assumed that the information processing apparatus is included in one (base station A) of the two base stations.

In FIGS. 6 and 7, the base station A may acquire information on communication status from the terminal device A1 (S601) and the terminal device A2 (S602), and may handle the information as the sample for the first information on the fixed terminal device. The base station A generates the first information from the sample for the collected first information (S603). Further, the base station A acquires the information on the communication status from the terminal device A3 (S604), and handles the information as a sample for the second information on the moving terminal device. The base station A generates the second information from the sample for the collected second information (S605). In S603 and S605, the base station A uses, for example, an average value, a maximum value, a standard deviation, and the like of the collected samples as the first information and the second information. Similarly, the base station B acquires the information on the communication status from the terminal device B1 (S607) and the terminal device B2 (S608), and handles the information as the sample for the first information on the fixed terminal device. The base station B generates the first information from the sample for the collected first information (S609). Note that the base station B does not generate the second information because the moving terminal device is not connected.

In FIG. 6, since the information processing apparatus exists outside the base station, the base station A provides the generated first information and second information to the information processing apparatus (S606). In addition, the base station B provides the generated first information to the information processing apparatus (S610). At this time, each base station may notify the information processing apparatus of the information (for example, identification information) indicating its own device in order to indicate to which base station the provided information belongs. Note that when the information processing apparatus may determine a transmission source of the information, the information indicating the base station may be omitted from the information provided to the information processing apparatus. In FIG. 7, the information processing apparatus exists inside the base station A. Therefore, the information processing apparatus may acquire the first information and the second information on the terminal device connected to the base station A by the information collection by the base station A described above. Meanwhile, the information processing apparatus does not have the information on the base station B. Therefore, the base station B provides the collected first information to the base station A (information processing apparatus) (S701). As a result, the information processing apparatus may acquire information on the communication status of the terminal devices connected to the base stations A and B.

In this way, by preparing the information on the communication status of communication by the fixed terminal and the mobile terminal, respectively, and determining which of the information is preferentially used according to the situation, appropriate information may be used in the predetermined control processing depending on, for example, the number or usage of samples. Further, as a result, it is possible to improve the accuracy of the predetermined control processing.

According to one embodiment of the disclosure, an information processing apparatus includes: a memory for storing computer readable code and a processor operatively coupled to the memory, the processor configured to: acquire first information on communication status of a fixed terminal device and second information on communication status of a mobile terminal device, and determine which of the first information and the second information is preferentially used to execute predetermined control processing.

According to this embodiment, the information processing apparatus preferentially uses either the information on the communication status of the fixed terminal or of the mobile terminal, respectively, according to the situation, so that the predetermined control processing may be more appropriately performed. That is, the execution accuracy of the predetermined control processing may be improved depending on the situation, for example, by preferentially using the information suitable for the predetermined control processing. In one example, when the predetermined control processing is a remote operation control, the information on the communication status of the mobile terminal may be preferentially used. That is, since the terminal device mounted in the driving vehicle is the mobile terminal, the accuracy of the remote driving may be improved by preferentially using the information on the communication status of the mobile terminal. However, when the number of times of acquisition of the information on the communication status of the mobile terminal is small, it is assumed that the accuracy of the information on the communication status of the mobile terminal is low. For example, on a predetermined road where the traveling frequency of the vehicle equipped with the terminal device is low, it is assumed that the frequency with which the information on the communication status of the mobile terminal may be acquired is low, and the accuracy is not sufficient. Meanwhile, when there is the fixed terminal disposed along the predetermined road, the fixed terminal periodically performs the communication to easily acquire the information on the communication status of the fixed terminal multiple times. Therefore, for example, depending on the number of times of acquisition of the information on the communication status of the mobile terminal, it may be determined whether to preferentially use the information on the communication status of the mobile terminal or the information on the communication status of the fixed terminal.

The information processing apparatus described in the above embodiment, in which: the processor is configured to determine which of the first information and the second information is preferentially used, depending on a number of samples acquired for the second information on the communication status of the mobile device.

According to this embodiment, for example, the accuracy of the communication status may be estimated depending on the number of times of acquisition of the samples of the information on the communication status of the mobile terminal, and the predetermined control processing may be appropriately executed accordingly.

The information processing apparatus described in the above embodiment, in which: the processor is configured to execute the predetermined control processing by preferentially using the second information on the communication status of the mobile terminal device based on the number of samples of the second information exceeding a first predetermined number.

According to this embodiment, when the number of samples of the second information on the communication status of the mobile terminal is sufficient and the accuracy of the second information is predicted to be sufficiently high, it is possible to execute the predetermined control processing by preferentially using the second information. For example, every time the vehicle equipped with the terminal device travels on a road, the sample for the communication status is acquired, and the communication status when traveling on the road is predicted with high accuracy by sufficiently accumulating a number of samples of the communication status of the mobile terminal, therefore, it is possible to execute highly accurate remote driving control.

The information processing apparatus described in the above embodiments, in which: the processor is configured to execute the predetermined control processing by preferentially using the first information based on the number of samples of the second information not exceeding a second predetermined number.

According to this embodiment, when the number of samples for the second information on the communication status of the mobile terminal is insufficient and the accuracy of the second information is predicted to be not high, it is possible to execute the predetermined control processing by using the first information in preference to the second information. For example, in the situation where the sample for the communication status is acquired every time the vehicle equipped with the terminal device travels on a road, even if the number of samples for the communication status of the mobile terminal is insufficient, by using a large number of accumulated samples for the communication status of the fixed terminals arranged along the road, it is possible to predict a quasi-static communication status around the road. As described above, since the tendency of the communication status around at least the terminal position (for example, road) may be understood by the first information, it is possible to execute the predetermined control processing with a certain accuracy.

The information processing apparatus described in the above embodiment, in which: the fixed terminal device includes a road terminal device arranged in association with a predetermined road, and the processor is configured to preferentially use the first information of the road terminal device to execute the predetermined control processing.

According to this embodiment, the tendency of the communication status when communicating along the predetermined road may be understood, and the predetermined control processing may be appropriately executed. In particular, by preferentially using the information on the communication status of the road terminal device, it is possible to perform predetermined road-related control processing such as remote driving, automatic driving, or navigation based on the information on the appropriate communication status.

The information processing apparatus described in the above embodiment, in which: the predetermined road is a road associated with a predetermined operation mode of the mobile terminal moving on the predetermined road.

According to this embodiment, it is possible to collect a large amount of information on the communication quality for a road that is in a state in which the mobile terminal is scheduled to operate in a predetermined operation mode or cannot operate in such an operation mode. As a result, for example, it becomes possible to improve the accuracy of the operation in the predetermined operation mode and to expand the range in which the predetermined operation mode may be executed.

The information processing apparatus described in any one of the above embodiments, in which: the processor is configured to acquire the first information and the second information on a terminal device connected to each of one or more base stations.

According to this embodiment, for each of one or more base stations, it is possible to separately acquire the information on the communication status at the time of connecting and communicating with the base stations. For this reason, for example, when the predetermined control processing is the connection destination setting control of the terminal device, it is possible to appropriately select the base station of the connection destination of the terminal device in consideration of the communication status when connecting to each base station.

The information processing apparatus described in the above embodiment, in which: a first base station of the one or more base stations includes the information processing apparatus; and the processor is configured to acquire the first information and the second information on the terminal device connected to the first base station.

According to this embodiment, the information processing apparatus may collect the information on the communication status when the terminal device is connected to its own base station based on the communication executed by its own base station. In addition, the information processing apparatus may appropriately execute the control processing for, for example, selecting a handover destination of the connected terminal device by acquiring the information on the communication status of other neighboring base stations.

The information processing apparatus described in any one of the above embodiments, further includes: a communication circuit, and the processor is configured to provide at least one of the first information and the second information to other devices according to requests from the other devices through the communication circuit.

According to this embodiment, when the other devices such as the base station or the terminal device make a request, the acquired information may be provided to the other devices. As a result, it is possible for the other devices to execute the control based on the acquired information.

The information processing apparatus described in any one of the above embodiments, in which: the mobile terminal device is a terminal device mounted in a vehicle.

According to this embodiment, since the communication status of the communication by the terminal device mounted in the vehicle is collected, it is possible to appropriately execute the vehicle control such as the remote driving by using the second information on the communication status.

According to a second embodiment of the disclosure, a computer-implemented method executed by an information processing apparatus includes: acquiring first information on communication status of a fixed terminal device and second information on communication status of a mobile terminal device; and determining which of the first information and the second information is preferentially used to execute predetermined control processing.

According to this embodiment, the computer-implement method executed by the information processing apparatus preferentially uses any one of the information on the communication status of the fixed terminal and the mobile terminal, respectively, according to the situation, so that the predetermined control processing may be more appropriately performed.

According to a third embodiment of the disclosure, a non-transitory computer readable storage medium storing instructions that when executed by a computer, which includes a processor, perform a method, the method includes: acquiring first information on communication status of a fixed terminal device and second information on communication status of a mobile terminal device; and determining which of the first information and the second information is preferentially used to execute predetermined control processing.

According to this embodiment, the method preferentially uses any one of the information on the communication status of the fixed terminal and the mobile terminal, respectively, according to the situation, so that the predetermined control processing may be more appropriately performed.

The disclosure is not limited to the above embodiments, and various modifications and changes are possible within the scope of the disclosure.

The invention claimed is:

1. An information processing apparatus, comprising:
   a memory for storing computer readable code; and
   a processor operatively coupled to the memory, the processor configured to:
   acquire first information on communication status of a fixed terminal device and second information on communication status of a mobile terminal device; and
   determine which of the first information and the second information is preferentially used to execute predetermined control processing depending on a number of samples acquired for the second information on the communication status of the mobile terminal device.

2. The information processing apparatus according to claim 1, wherein the processor is configured to execute the predetermined control processing by preferentially using the second information on the communication status of the mobile terminal device based on the number of samples of the second information exceeding a first predetermined number.

3. The information processing apparatus according to claim 2, wherein the processor is configured to execute the predetermined control processing by preferentially using the first information on the communication status of the fixed terminal device based on the number of samples of the second information not exceeding a second predetermined number.

4. The information processing apparatus according to claim 1, wherein:
the fixed terminal device includes a road terminal device arranged in association with a predetermined road; and
the processor is configured to preferentially use the first information of the road terminal device to execute the predetermined control processing.

5. The information processing apparatus according to claim 4, wherein the predetermined road is a road associated with a predetermined operation mode of the mobile terminal device moving on the predetermined road.

6. The information processing apparatus according to claim 1, wherein the processor is configured to acquire the first information and the second information on a terminal device connected to each of one or more base stations.

7. The information processing apparatus according to claim 6, wherein:
a first base station of the one or more base stations includes the information processing apparatus; and
the processor is configured to acquire the first information and the second information on the terminal device connected to the first base station.

8. The information processing apparatus according to claim 1, further comprising a communication circuit, wherein the processor is configured to provide at least one of the first information and the second information to other devices according to requests from the other devices through the communication circuit.

9. The information processing apparatus according to claim 1, wherein the mobile terminal device is a terminal device mounted in a vehicle.

10. A computer-implemented method executed by an information processing apparatus, comprising:
acquiring first information on communication status of a fixed terminal device and second information on communication status of a mobile terminal device; and
determining which of the first information and the second information is preferentially used to execute predetermined control processing; and
determining a number of samples acquired for the second information on the communication status of the mobile terminal device.

11. The computer-implement method executed by an information processing apparatus according to claim 10, further comprising: executing the predetermined control processing by preferentially using the second information on the communication status of the mobile terminal device based on the number of samples acquired for the second information exceeding a first predetermined number.

12. The computer-implement method executed by an information processing apparatus according to claim 11, further comprising: executing the predetermined control processing by preferentially using the first information on the communication status of the fixed terminal device based on the number of samples acquired for the second information not exceeding a second predetermined number.

13. The computer-implement method executed by an information processing apparatus according to claim 10, further comprising: executing the predetermined control processing by preferentially using the first information on the communication status of the fixed terminal device, wherein the fixed terminal device includes a road terminal device arranged in association with a predetermined road.

14. The computer-implement method executed by an information processing apparatus according to claim 13, wherein the predetermined road is a road associated with a predetermined operation mode of the mobile terminal device moving on the predetermined road.

15. The computer-implement method executed by an information processing apparatus according to claim 10, further comprising: acquiring the first information and the second information on a terminal device connected to each of one or more base stations.

16. The computer-implement method executed by an information processing apparatus according to claim 15, wherein: the terminal device is connected to a first base station of the one or more base stations, and the first base station includes the information processing apparatus.

17. The computer-implement method executed by an information processing apparatus according to claim 10, further comprising: providing at least one of the first information and the second information to a second device according to a request from the second device.

18. A non-transitory computer readable storage medium storing instructions that when executed by a computer, which includes a processor, perform a method, the method comprising:
acquiring first information on communication status of a fixed terminal device and second information on communication status of a mobile terminal device;
determining which of the first information and the second information is preferentially used to execute predetermined control processing; and
determining a number of samples acquired for the second information on the communication status of the mobile terminal device.

\* \* \* \* \*